United States Patent
Draper (10) Patent No.: US 11,576,047 B2
(45) Date of Patent: Feb. 7, 2023

(54) DEVICE, SYSTEM, AND METHOD FOR CYBER ISOLATING MOBILITY SYSTEMS WHEN A VEHICLE IS IN MOTION

(71) Applicant: VALEO COMFORT AND DRIVING ASSISTANCE, Créteil (FR)

(72) Inventor: Andrew Peter Draper, Troy, MI (US)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 134 days.

(21) Appl. No.: 17/116,271

(22) Filed: Dec. 9, 2020

(65) Prior Publication Data

US 2022/0182833 A1 Jun. 9, 2022

(51) Int. Cl.
*H04W 12/088* (2021.01)
*H04W 12/37* (2021.01)
*G07C 5/08* (2006.01)
*H04L 67/12* (2022.01)
*H04W 12/06* (2021.01)

(52) U.S. Cl.
CPC ........ *H04W 12/088* (2021.01); *G07C 5/0808* (2013.01); *H04L 67/12* (2013.01); *H04W 12/06* (2013.01); *H04W 12/37* (2021.01)

(58) Field of Classification Search
CPC ... H04W 12/088; H04W 12/37; H04W 12/06; G07C 5/0808; H04L 67/12
See application file for complete search history.

(56) References Cited

U.S. PATENT DOCUMENTS

| | | |
|---|---|---|
| 2016/0381059 A1 | 12/2016 | Galula et al. |
| 2017/0357801 A1* | 12/2017 | Sanchez ............... G06F 21/577 |
| 2018/0048674 A1* | 2/2018 | Black .................. H04W 12/069 |
| 2019/0278949 A1 | 9/2019 | Wu et al. |
| 2019/0306187 A1 | 10/2019 | Dyakin et al. |
| 2019/0384322 A1* | 12/2019 | Luckevich ............ B60W 30/14 |
| 2020/0164900 A1* | 5/2020 | Coester ................ B61B 13/122 |

\* cited by examiner

*Primary Examiner* — Ashokkumar B Patel
*Assistant Examiner* — William B Jones
(74) *Attorney, Agent, or Firm* — Osha Bergman Watanabe & Burton LLP (57) ABSTRACT

An air-gap device for isolating mobility systems when a vehicle is in motion may include a housing. The housing may include various input ports and various output ports. The various input ports may include connections to a secure gateway. The various output ports may include connections to one or more mobility Electronic Control Units (ECUs). The air-gap device may include at least one pair of terminal contacts. The at least one pair of terminal contacts may include a first terminal contact and a second terminal contact. The air-gap device may include an air gap embedded in the housing. The air gap may be open when the first terminal is not in contact with the second terminal contact. The air-gap device may be instructed to open the air gap when the vehicle is determined to be in motion or about to be in motion.

17 Claims, 7 Drawing Sheets

DEVICE, SYSTEM, AND METHOD FOR CYBER ISOLATING MOBILITY SYSTEMS WHEN A VEHICLE IS IN MOTION

BACKGROUND

Mobility systems in motor vehicles may include one or more devices for directing movement of the motor vehicle. Nowadays, mobility systems (which direct, at a minimum, acceleration, braking and steering) are incorporated in one or more Electronic Control Units (ECUs) that are configured based on instructions obtained through software applications. Motor vehicles may be vulnerable if these software applications were to be compromised or hacked. In this regard, automotive cybersecurity is a challenge for automakers or motor vehicle manufacturers because hackers are constantly improving their approaches for compromising the software applications. Further, it can be a challenge for motor vehicle manufactures to deploy software security updates into the field due to limitations in access to all of the vehicle fleet. Access has been traditionally achieved by owner notification, dealer networks and more recently by Over-the-Air Update capability. Even with these methods the undertaking is onerous. While software applications may be protected with techniques such as firewalls, asymmetric cryptography, and Intrusion Detection Systems, a highly skilled hacker may eventually find a way to infiltrate a network connections associated to the software applications. Finally, while devices provided by third-parties may guard the network connection to monitor and block inappropriate traffic, these devices solely work as an additional firewall or filter to limit traffic by defining which devices can talk to the motor vehicle.

SUMMARY

An air-gap device for isolating cyber mobility systems when a vehicle is in motion includes a housing. The housing includes various input ports and various output ports. The various input ports include connections to a secure gateway. The various output ports include connections to one or more mobility Electronic Control Units (ECUs). The air-gap device includes at least one pair of terminal contacts. The at least one pair of terminal contacts includes a first terminal contact and a second terminal contact. The air-gap device includes an air gap embedded in the housing. The air gap is closed when the first terminal contact is in contact with the second terminal contact. The air gap is open when the first terminal is not in contact with the second terminal contact. The air-gap device is instructed to open the air gap when the vehicle is determined to be in motion or about to be in motion.

A system for cyber isolating mobility systems when a vehicle is in motion includes a gateway device. The gateway device is connected to one or more infotainment Electronic Control Units (ECUs), one or more Body ECUs, one or more Telematics ECUs, or on-board diagnostics of the vehicle. The system includes one or more mobility ECUs. The one or more mobility ECUs include one or more powertrain ECUs, one or more chassis ECUs, and one or more advance driver-assistance systems (ADAS) ECUs. The system includes an air-gap device. The air-gap device includes a housing. The housing includes various input ports and various output ports. The various input ports include connections to a secure gateway. The various output ports include connections to the one or more mobility ECUs. The air-gap device includes at least one pair of terminal contacts. The at least one pair of terminal contacts includes a first terminal contact and a second terminal contact. The air-gap device includes an air gap embedded in the housing. The air gap is closed when the first terminal contact is in contact with the second terminal contact. The air gap is open when the first terminal is not in contact with the second terminal contact. The air-gap device is instructed to open the air gap when the vehicle is determined to be in motion or about to be in motion.

A method for isolating mobility systems when a vehicle is in motion includes obtaining, by a gateway device, a vehicle status of the vehicle. The vehicle status indicates whether the vehicle is in motion or about to be in motion. The method includes determining, by a plurality of mobility Electronic Control Units (ECUs), a status of an air-gap device. The status indicates whether the air-gap device is in a secured state. The method includes confirming, by the plurality of mobility ECUs, whether the vehicle is in motion. The method includes confirming, by the plurality of mobility ECUs, a connectivity level requirement based on the vehicle status. The method includes determining a security level requirement based on the connectivity level requirement. The method includes generating an air gap instruction indicating whether to enable the air gap or to disable the air gap based on the security level requirement determined.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In motor vehicles, attack surfaces that could potentially be used to disrupt the behavior of the vehicle's sub-systems may be protected by cyber security systems and methods. The systems and methods may include secure boot, fire-walling, public/private keys, authentication, intrusion detection and prevention systems together with the delivery of security patches and updates. The systems and methods of protecting motor vehicles are based on software applications that provide security layers over critical vehicle functions. The software applications rely on cryptographic security methods to prevent unauthorized access. In these cases, a rejection of an attack is based on probability.

In general, embodiments of the invention include a device, a system, and a method that provide a layered approach to vehicle cybersecurity. In some embodiments, the device reduces the probability of success of an attack and mitigates any ramifications of a potential unauthorized access by implementing a layer of protection via a physical isolation mechanism. More specifically, in one or more embodiments, this isolation mechanism may create an air gap between any potential attack surfaces, susceptible to attack vectors, and critical mobility systems. Potential attack surfaces may be a set of interfaces (i.e., "attack vectors" when these interfaces are vulnerable) where an unauthorized user may try to enter/extract data to/from a system, or to modify a behavior of the system. In some embodiments, attack vectors are interfaces or paths an attacker may use to exploit a vulnerability in a communication network. For instance, an exploit may use an open IP port vulnerability on a variety of different attack vectors such as Wi-Fi, cellular networks, or IP over Bluetooth. Attack vectors may enable attackers to exploit system vulnerabilities, including a driver or an occupant in the motor vehicle.

In some embodiments, the isolation mechanism is an air-gap device. The critical mobility systems may be isolated when the air-gap device activates the air gap during mobility events allowing communication to diagnostics systems and over-the-air (OTA) updates at other times. In one or more embodiments, the vehicle network architectures are not significantly altered using the air-gap device because the air-gap device may be an intermediate device that physically separates a convenience domain from a mobility domain of the motor vehicle.

In one or more embodiments, the device, the system, and the method allow connection to cyber-interfaces, through a firewall, when the vehicle is stationary and then transition to an air-gap mode when the vehicle is in motion. In this regard, implementing the device, the system, and the method may prevent real-time cyber-attack vectors reaching mobility relevant systems (i.e., engine, brakes, steering) when the vehicle is being driven, thus preventing hacking situations on-the-fly. Cyber security methods such as firewalling, public/private keys, authentication, intrusion detection/prevention, should be maintained such that the device, the system, and the method may protect from an attack reaching mobility relevant systems while the vehicle is in motion or stationary.

Figure 1:
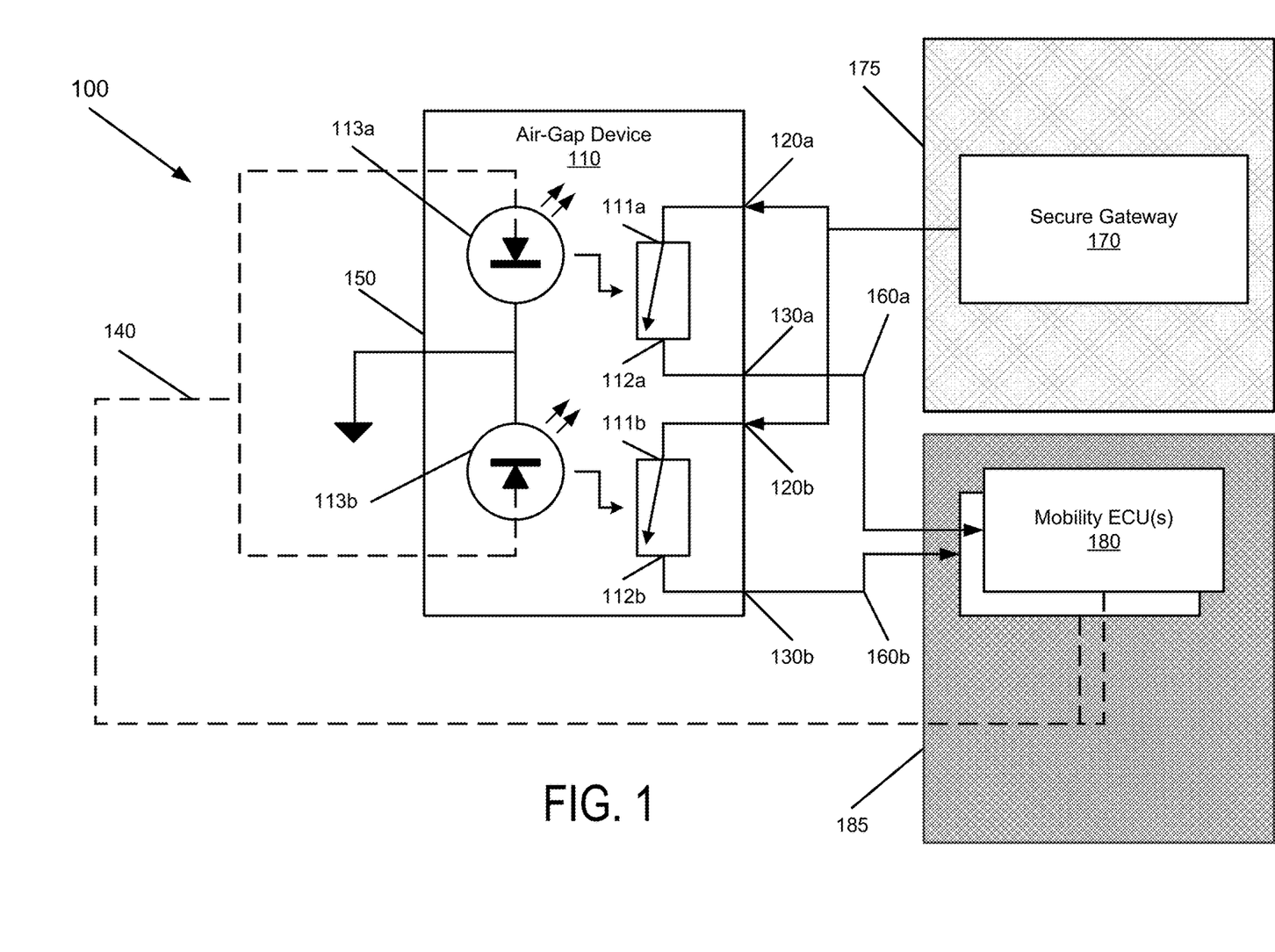
FIG. 1 shows a schematic diagram of an air-gap device in accordance with one or more embodiments.

FIG. 1 illustrates a system configuration for preventing network attacks in a communication network 100 of a motor vehicle in accordance with one or more embodiments. In particular, the system may include an air-gap device 110 implementing a physical layer with a defense system inside the communication network 100 that prevents unwanted terminal connections into the communication network 100. To this point, an attack is any successful connection and allocation of network resources to an unauthorized terminal (not shown). As such, preventing an attack may involve any monitoring, identifying, and controlling of physical connections from terminals attempting to infiltrate the communication network 100. According to one or more embodiments, FIG. 1 shows the air-gap device 110 connected to the communication network 100 and disposed between a convenience domain 175 and a mobility domain 185. The mobility domain 185 may include ports associated with various mobility controls. These mobility controls may be directed towards monitoring and regulating an engine, steering devices, brakes, cameras, radar devices, or stationary charging mechanisms of the motor vehicle. The convenience domain 175 may include ports associated to various communication controls. These communication controls may be directed towards monitoring and regulating wireless connections or protocols (i.e., Global Navigation Satellite System (GNSS), AM/FM/HD radio, cellular, internet, Bluetooth, Near-Field-Communication (NFC)), wired connections to storage media (i.e., smartphones, USBs, CDs, DVDs, or MSDs), secure keyless entry device connections, or Tire Pressure Monitoring Systems (TPMSs) to the motor vehicle.

In one or more embodiments, the air-gap device 110 provides cyber isolation, or air-gapping, for any relevant mobility domain electronic modules (i.e., mobility related Electronic Control Unit (ECUs)). The air-gap device 110 may be configured to activate the air gap to physically separate the mobility domain electronic modules from the rest of a motor vehicle communications network when the motor vehicle is in a mobility mode as determined by one or more parameters (e.g., a combination of engine running, drivetrain engaged, or vehicle moving). The air gap may be a space between two consecutive points of contact in an otherwise continued physical connection. The air gap may be an insulated space that interrupts data and commands from continued travelling or transmission. In some embodiments, the air gap device 110 may be installed during manufacturing of the motor vehicle such that any motor vehicle built with an air gap device 110 may be considered to have an underlying layer of security irrespective of any additional security protocols, firewalls, or software applications.

FIG. 1 shows that the air-gap device 110 may include a housing 150 with various input ports 120a and 120b and various output ports 130a and 130b. The air-gap device 110 may be connected between a secure gateway 170 and one or more mobility ECUs 180 such that the air-gap device 110 may automatically control the physical connections between the secure gateway 170 and the one or more mobility ECUs 180. The secure gateway 170 may be a point of contact for the convenience domain 175 of the motor vehicle, and the one or more mobility ECUs 180 may be completely incorporated in the mobility controls of the motor vehicle. The input ports 120a and 120b may be physical connections between the secure gateway 170 and the air-gap device 110. The output ports 130a and 130b may be physical connections between the air-gap device 110 and the one or more mobility ECUs 180.

While FIG. 1 shows arrows going from the secure gateway 170 to the one or more mobility ECUs 180, this is only shown to illustrate that the secure gateway 170 gains access to mobility information in the mobility ECUs 180 in the direction of the arrows. Once the physical connections are established, communication signals 160a and 160b may be exchanged (i.e., back and forth) between the secure gateway 170 and the one or more mobility ECUs 180.

In one or more embodiments, the physical connections may be implemented through one or more relays (i.e., mechanical or solid state) actuated using one or more control signals 140 received from one or more mobility ECUs 180 indicating whether the physical connections are enabled or disabled. These physical connections may include a pair of terminal contacts 111a and 112a or 111b and 112b for each relay. The relay may include opto-isolators 113a and 113b. A first contact 111a and 111b may be a switchable connection corresponding to the actuating of the relay. In this regard, when the mobility ECUs 180 identify that the vehicle is in motion, or about to start moving, the mobility ECUs 180 may automatically instruct the air-gap device 110 using one or more control signals 140 to open the terminal contact pairs 111a and 112a and 111b and 112b. As such, the air-gap device (110) may include an air gap embedded in the housing 150 when the terminal contact pairs 111a and 112a and 111b and 112b are separated when the air-gap device 110 is instructed to open the air-gap based on the one or more control signals 140. Similarly, when the mobility ECUs 180 identify that the vehicle is stopped, or about to stop moving, the mobility ECUs 180 may instruct the air-gap device 110 using one or more control signals 140 to close the terminal contact pairs 111a and 112a and 111b and 112b.

The air-gap device 110 may physically disconnect networks/data buses between critical mobility systems and non-critical mobility systems, by opening the air gap and creating a disconnect between the two. The critical mobility systems are safety-critical vehicle control systems responsible for brakes, steering and propulsion. The air-gap device 110 may provide the necessary terminations for networks to preserve network integrity (i.e., termination resistors) such that both halves of the isolated networks may remain functional. The air-gap device 110 may be automatically activated by the critical mobility systems and not by the non-critical mobility systems. In some embodiments, the air-gap device 110 may be in a passive/unpowered state such that networks are not isolated. In some embodiments, the air-gap device 110 may be in an active/powered state such that networks are isolated.

Although the air-gap device (110) is shown in FIG. 1 between the secure gateway (170) and the mobility ECUs (180), those of ordinary skill in the art will appreciate that the air-gap device (110) may be implemented in the secure gateway, or in one of the mobility ECUs, without departing from the scope herein. Further, in one or more embodiments, the air-gap device 110 may be deployed across multiple physical locations in the motor vehicle. In some embodiments, the elements in the system may be executed on a single device with various physical layers and corresponding resources broken down to provide the functionality associated with each element in the system. For example, the air-gap device 110 may be a device dedicated for each mobility ECU out of the one or more ECUs 180 such that each air-gap device 110 may be actuated using a unique corresponding control signal 140.

Figure 2:
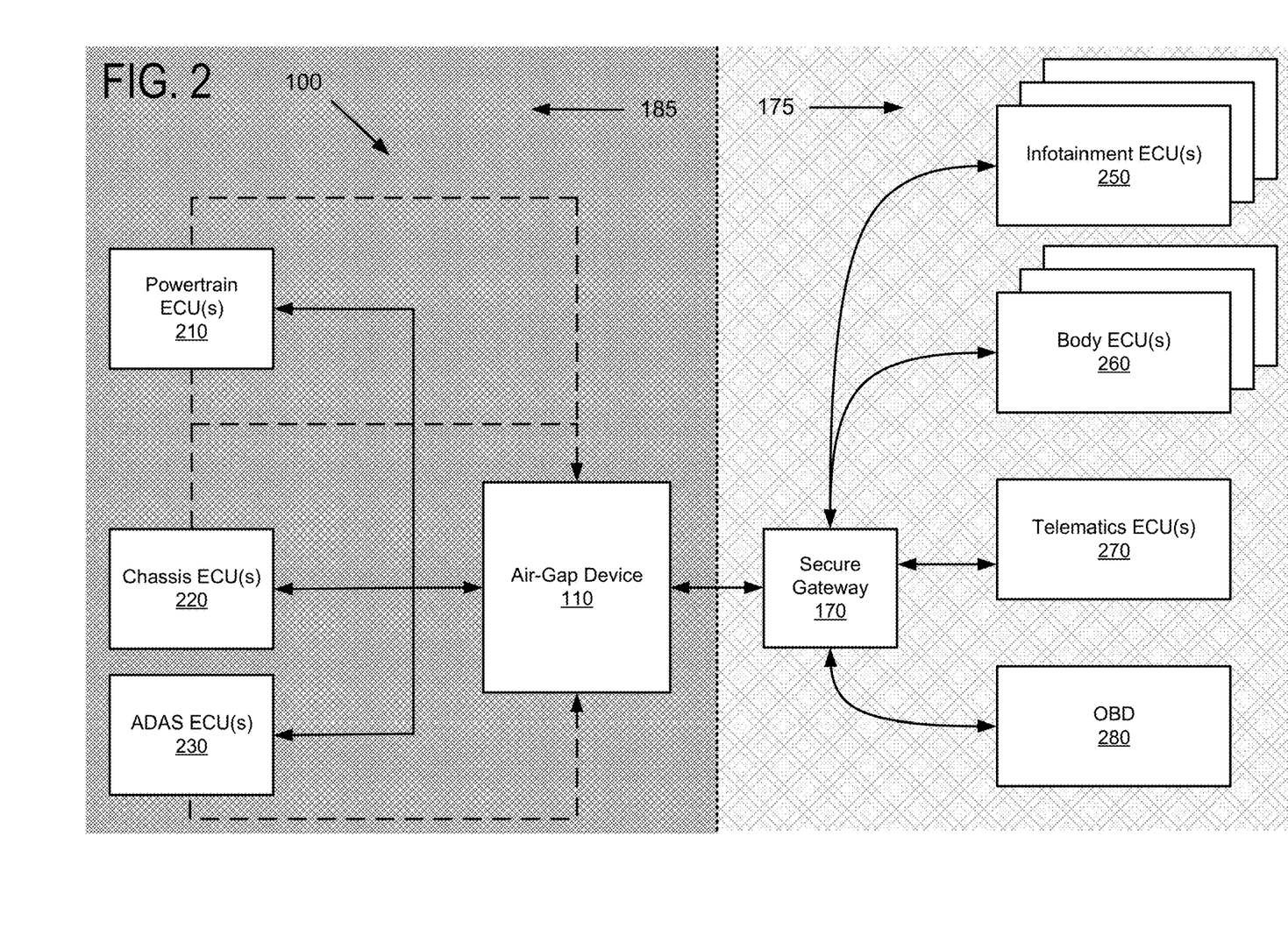
FIG. 2 shows a schematic diagram of a system including an air-gap device in accordance with one or more embodiments.

FIG. 2 shows various types of communication among the elements in the communication network 100 including the air-gap device 110. A type of communication may include required network connections/communications, such as established or soon-to-be-established communication links shown in solid connection lines. Another type of communication may include control signals, such as instructions shown in dashed connection lines. As described in reference to FIG. 1, the air-gap device 110 may separate a mobility domain 185 of the motor vehicle from a convenience domain 175 of the motor vehicle (denoted with arrows). In some embodiments, the mobility domain 185 may include critical mobility systems (i.e., the one or more mobility ECUs 180) such as one or more powertrain ECUs 210, one or more chassis ECUs 220, or one or more advance driver-assistance systems (ADAS) ECUs. In some embodiments, the convenience domain 175 may include non-critical mobility systems (i.e., the one or more communication systems) such as the secure gateway 170, one or more infotainment ECUs 250, one or more body ECUs 260, one or more telematics ECUs, or on-board diagnostics (OBD) 280.

In one or more embodiments, the secure gateway 170 provides the data routing between the mobility domain 185 and the convenience domain 175. When the motor vehicle is not in mobility mode (i.e., not being driven, for example), the air-gap device 110 between the secure gateway 170 and the communication systems may allow data traffic between the convenience domain 175 to the mobility domain 185. This may allow functionality such as service enquiries via an OBD port, remote vehicle diagnostics via the one or more telematics ECUs 270 and over-the-air (OTA) reflash. Further, when the one or more Powertrain ECUs 210, the one or more chassis ECUs 220, and the one or more ADAS ECUs 230 determine that the vehicle is in, or is about to, transition to mobility mode, the air-gap device 110 may be activated to physically isolate the one or more mobility ECUs 170 from the secure gateway 170/data busses from the convenience domain 175.

Figure 3:
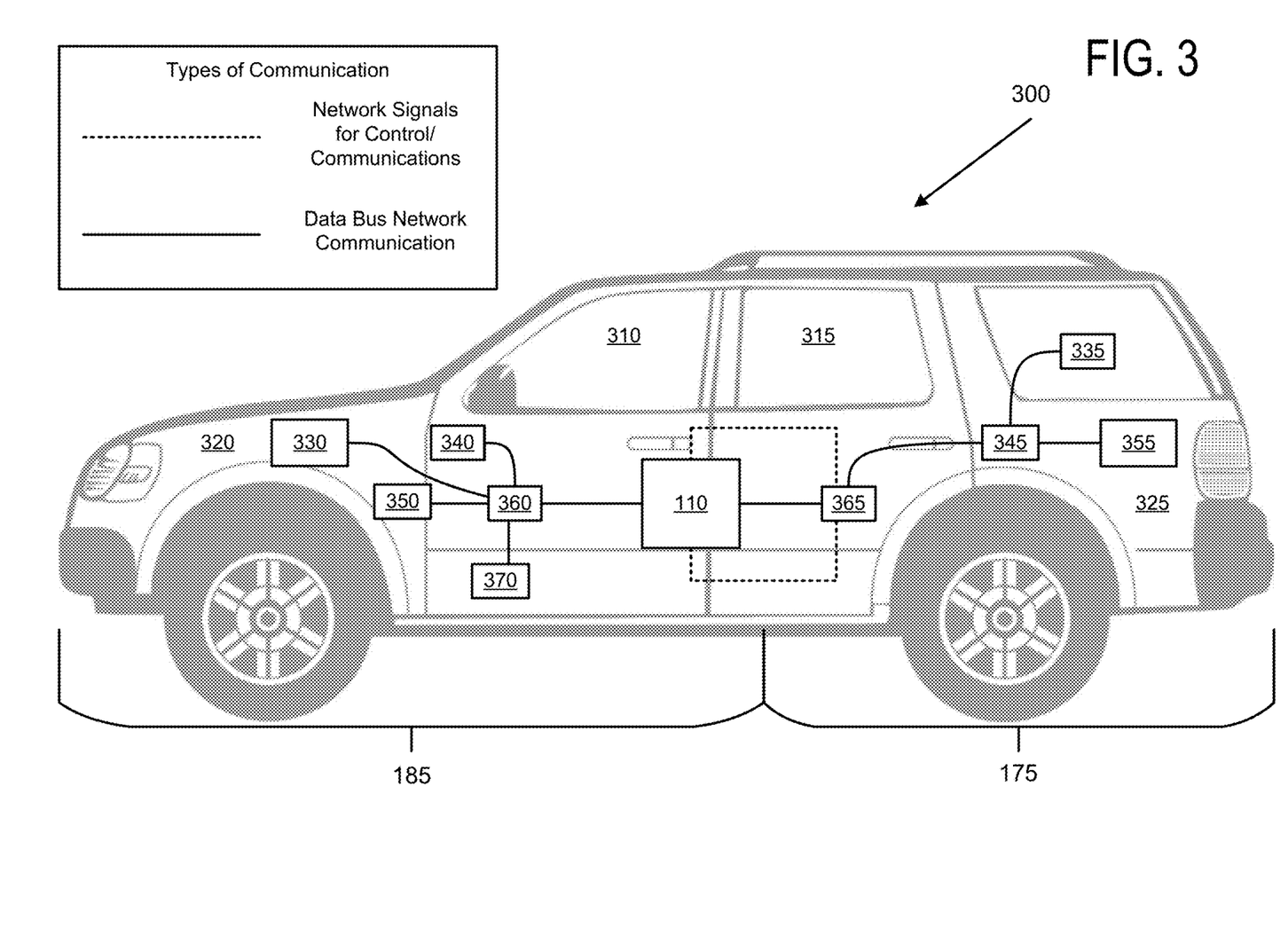
FIG. 3 shows a schematic diagram of a system including an air-gap device in accordance with one or more embodiments.

FIG. 3 shows a block diagram of a system in accordance with one or more embodiments. Specifically, FIG. 3 shows an example of a motor vehicle 300 including the mobility domain 185 and the convenience domain 175 distributed among various devices in different locations. The various locations may include a driver area 310, a passenger area 315, a front area 320, or a rear area 325. The mobility domain 185 and the convenience domain 175 may be separated by the air-gap device 110 performing the physical separation operations described in reference to FIGS. 1 and 2. The air-gap device 110 may be connected to a mobility control module 360 that monitors and controls movement of the motor vehicle by tracking an engine module 330, a steering module 340, cameras and radar modules 350, and/or a brake module 370. The mobility control module 360 may include the mobility ECUs 180 discussed in FIG. 1 associated to one or more modules in of the mobility domain 185. The air-gap device 110 may be connected to a communication control module 365 that monitors and controls communication exchanged with the motor vehicle via a wireless communication module 335, a wired communication module 345, and/or a diagnostics module 355. The communication control module 365 may include the ECUs controlled through the security gateway 170 discussed in FIG. 1 and associated to one or more modules in of the convenience domain 175.

In one or more embodiments, a module, or sub-module, located at the front of the vehicle may include the same elements mirrored in the back of the vehicle. In one or more embodiments, the motor vehicle may be divided into the various locations including the driver area 310, the passenger area 315, the front area 320, and the rear area 325.

The front area 320 and the rear area 325 may be areas that any passenger does not have access through regular use of the motor vehicle. As such, these areas may include under and above the motor vehicle, under the hood at the front of the motor vehicle, or in the trunk at the back of the motor vehicle, respectively. This area may be larger in larger vehicles or vehicles that do not require a conventional engine, such as is the case with electric motor vehicles. In a hatchback vehicle, or a vehicle with the back or front exposed to the driver, this area may be considered as any area beyond the dashboard at the front or any area behind the back seats at the back.

The driver area 310 and the passenger area 315 may be any area that any passenger has access to at any point through regular use of the motor vehicle. For example, these area may include any area from the dashboard towards the direction of the driver and any area from the back seats towards the front of the car.

While FIGS. 1-3 show various configurations of components, other configurations may be used without departing from the scope of the disclosure. For example, various components in FIGS. 1-3 may be combined to create a single component (i.e., the secure gateway 170 may be modified to incorporate the air-gap device 110). As another example, the functionality performed by a single component may be performed by two or more components (i.e., powertrain ECUs 210 may be incorporated into mobility ECUs 180).

Figure 4:
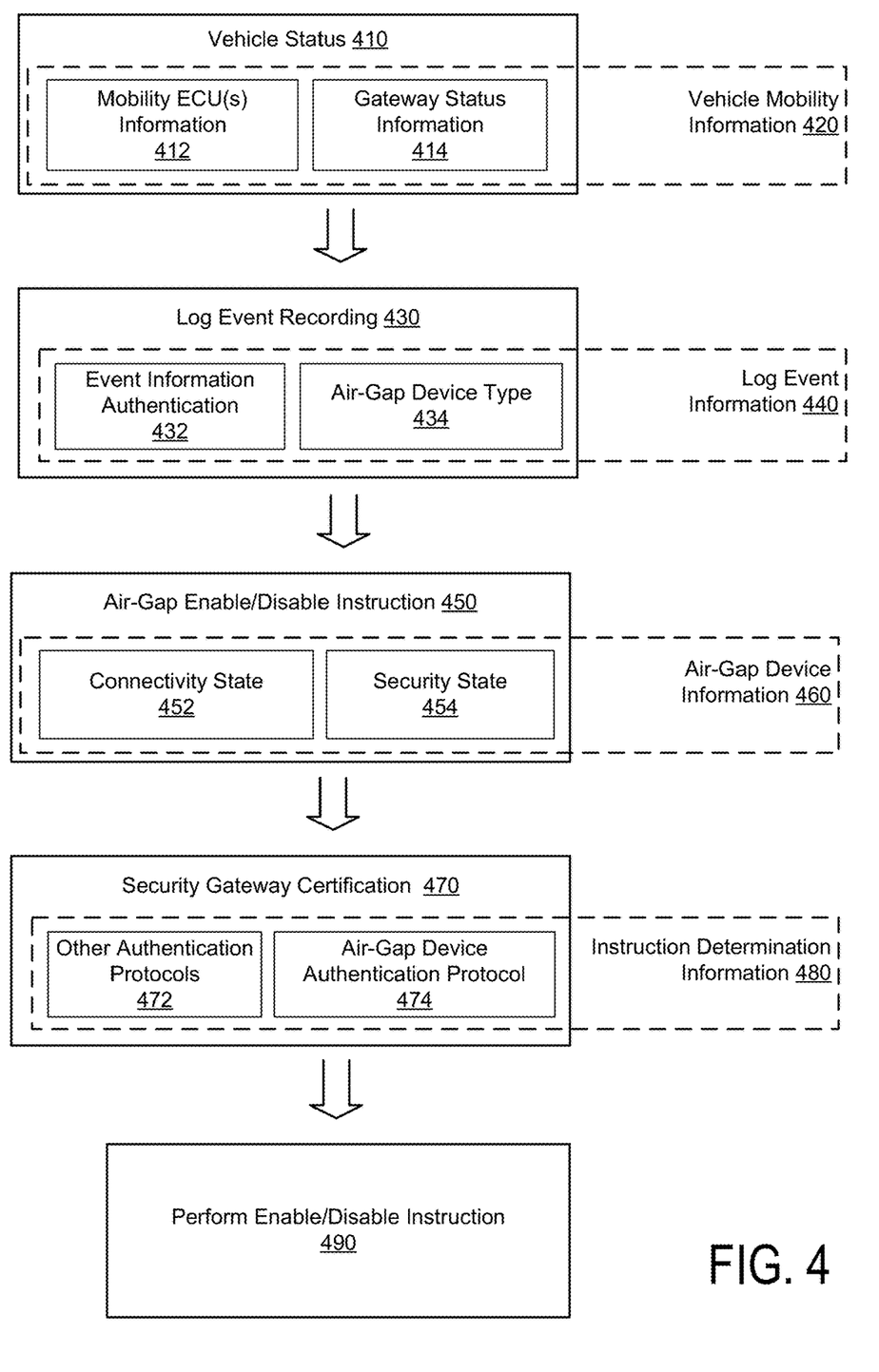
FIG. 4 shows an example in accordance with one or more embodiments.

FIG. 4 shows an example of generating instructions to the air-gap device 110 based on information identified by ECUs in the mobility domain 185 and/or the convenience domain 175. The instructions may be generated using a combination of ECUs in the mobility domain 185 and/or the convenience domain 175. Similarly, the instructions may be generated using information collected by a computing system (described in reference to FIG. 7) communicating with the air-gap device 110 through the mobility domain 185. In some embodiments, a vehicle status 410 may start a process of generating the instruction. The vehicle status 410 may collect vehicle mobility information 420 from the mobility ECUs 180 and the secure gateway 170. In this regard, the vehicle mobility information 420 may indicate mobility ECUs information 412 relating to one or more mobility markers for the mobility ECUs 180. The mobility markers may be indicators showing a status for ECUs in the mobility domain 185. Further, the vehicle mobility information 420 may indicate gateway status information 414 relating to one or more gateway markers for the security gateway 170. The gateway markers may be indicators showing a status of the data busses exchanging communication information from ECUs in the convenience domain 175.

FIG. 4 shows that after the vehicle mobility information 420 is processed, a log event recording 430 may use log event information 440 to identify a timestamp for enabling or disabling the air gap in the air-gap device 110. In some embodiments, obtaining the timestamp may include further identifying an event information authentication 432 and an air-gap device type 434. Once the event information authentication 432 and the air-gap device type 434 are identified, an air-gap enable/disable instruction 450 may be prepared. The event information authentication 432 may be identifying required busses or wired connection ports for reaching the air-gap device 110. The air-gap device type 434 may be identifying a method for exchanging communication signals with the air-gap device 110 (e.g., connection ports are different between a mechanical relay or a solid-state relay).

The air-gap enable/disable instruction 450 may be confirmed using an air-gap device information 460 using a connectivity state 452 and a security state 454 by confirming that the air-gap device 110 is connected properly and in a secured manner, respectively. Once the air-gap enable/disable instruction 450 is confirmed as a possible control parameter, the secure gateway 170 confirms that the convenience domain 175 is ready for separating by the air gap. Specifically, a security gateway certification confirms that the security gateway 170 is ready to be connected/disconnected by coordinating other authentication protocols 472 and an air-gap authentication protocol 474. The other authentication protocols 472 may include closing wireless communication protocols before enabling the air gap. The air-gap authentication protocol 474 may include identifying protocols required to disable the air gap to connect the mobility domain 185 and convenience domain 175. At this point, when the protocols are completed, the ECUs/the computer system may instruct to perform enable/disable instruction 490 of the air gap in the air-gap device 110.

Figure 5:
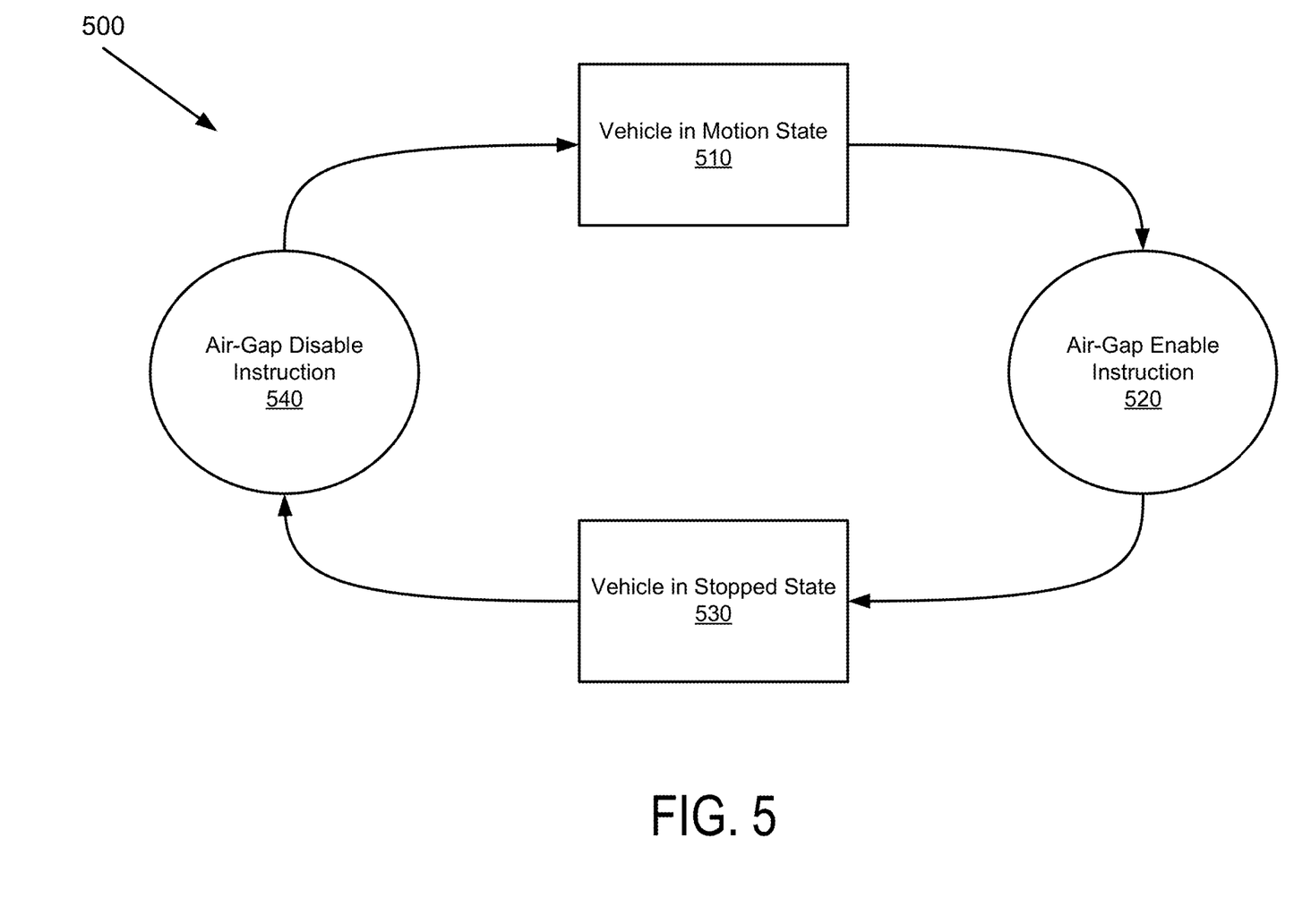
FIG. 5 shows a state diagram in accordance with one or more embodiments.

FIG. 5 shows an example of a state sequence 500 in the communication network 100 performing enable/disable instructions one or more embodiments. FIG. 5 illustrates an automatic processing of closing/opening the air gap based on a state of identifying a vehicle in motion state 510 or a vehicle in a stopped state 530. When the vehicle is identified to be in the vehicle in motion state 510 and the appropriate protocols have been performed as described in FIG. 4, the air gap in the air-gap device 110 is opened through an air-gap enable instruction 520. Further, when the vehicle is identified to be in the vehicle in stopped state 530 and the appropriate protocols have been performed as described in FIG. 4, the air gap in the air-gap device 110 is closed through an air-gap disable instruction 540. The changes between the multiple states may be performed automatically and without driver intervention. All control signals to the air-gap device 110 may be hardwired or encoded using hardware and/or software such that the states may transition without user (e.g., a driver, a passenger, or an occupant of the motor vehicle) interference.

Figure 6:
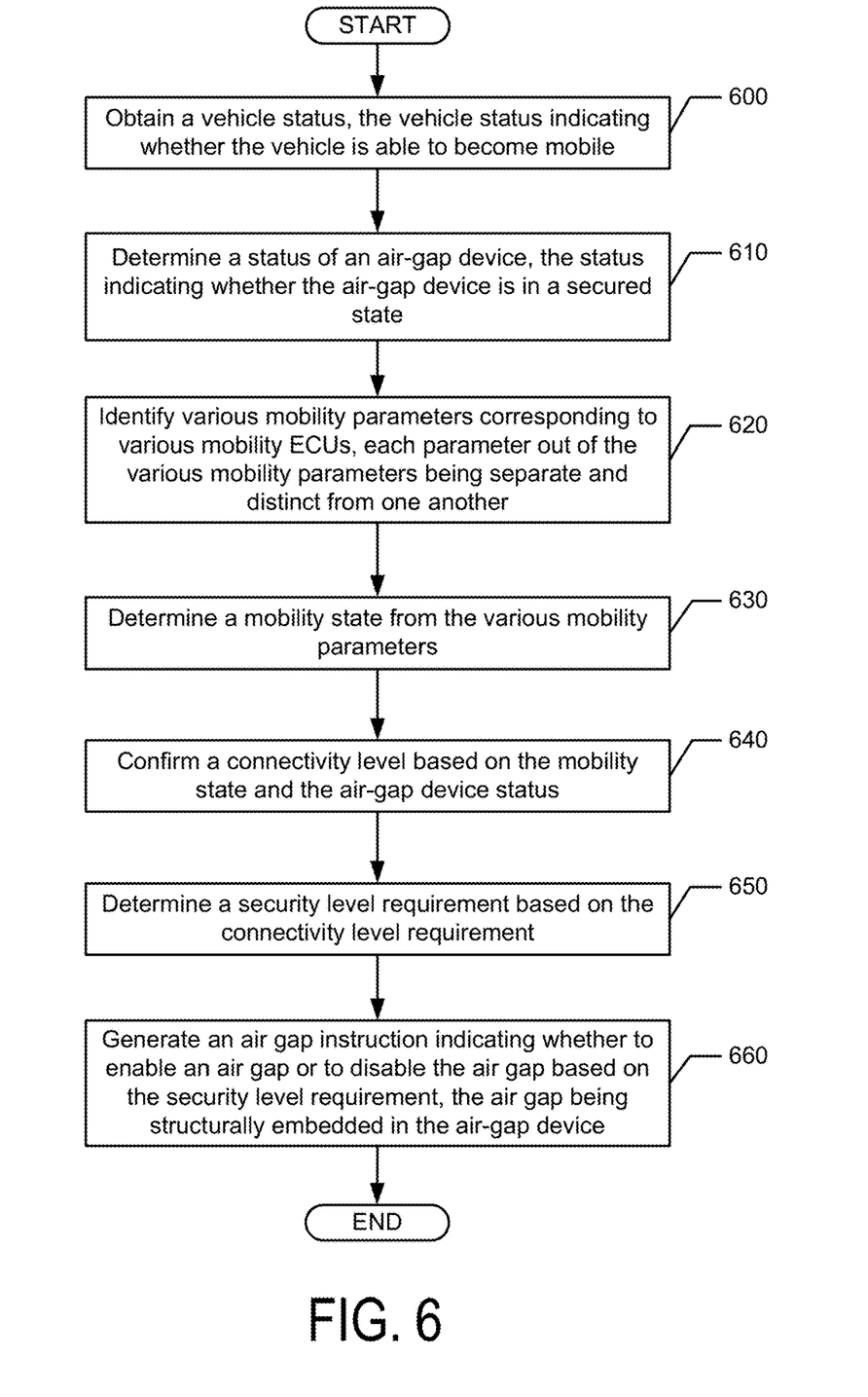
FIG. 6 shows a flowchart in accordance with one or more embodiments.

FIG. 6 shows a flowchart in accordance with one or more embodiments. Specifically, FIG. 6 describes a method for isolating mobility systems from the mobility domain 185 when the motor vehicle 300 is in motion. One or more blocks in FIG. 6 may be performed by one or more components as described above in FIGS. 1-3 (e.g., the multiple ECUs across mobility domain 185 and convenience domain 175). While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, the vehicle status 410 of the motor vehicle 300 is obtained, the vehicle status 410 indicates whether the motor vehicle 300 is able to become mobile. For example, the mobility ECUs 180 may collect vehicle mobility information 420 to identify the status of the engine of the motor vehicle. This vehicle status 410 indicates whether the engine is activated (i.e., running). If the vehicle status 410 indicates that the motor vehicle 300 is in motion, the mobility ECUs 170 indicate that the motor vehicle is in a vehicle in motion state 510. That is, Block 600 is the initiator to then proceed to determining the mobility state and that the vehicle status 410 (i.e., ignition on for an IC engine) would be a precursor to determining vehicle in motion via the mobility ECU(s) 180. In an electric vehicle, this may be more generalized as powertrain status indicating "Powertrain ON" or "Powertrain OFF."

In Block 610, a status of the air-gap device 110 is determined. The status of the air-gap device 110 indicates whether the air-gap device 110 is in a secured state. For example, the air-gap enable/disable instruction 450 may be triggered if the security state 454 indicates that the air-gap device 110 is secure according to the air-gap device information 460. Thai is, the secured state indicates whether the air-gap device 110 is fully functional, diagnostically operational, and/or no faults have been triggered.

In Block 620, various mobility parameters are identified corresponding to the mobility ECUs 180. Each parameter from the various mobility parameters are separate and distinct from one another. Connections for various mobility ECUs may be sampled and a parameter relating to each of them may be identified. The parameter may include a status of the connection (i.e., on or off), an identifier indicating whether each mobility ECU has completed a separation protocol to enable the air gap.

In Block 630, a mobility state is determined from the various mobility parameters. The mobility state is either vehicle in motion state 510 or vehicle in stopped state 530 such that the mobility state will be directly related to identifying that the parameters for the mobility ECUs 180 show that the mobility ECUs 180 are ready for separating from the security gateway 170.

In Block 640, a connectivity level requirement is determined based on the mobility state from block 630 and the air-gap device status from block 610. As described above, the mobility state is related to confirming that the mobility ECUs 180 are ready for sending the instruction enabling the air gap in the air gap device 110. The mobility state and the air-gap device state leads to obtaining the connectivity state 452 to generate the air-gap enable/disable instruction 450.

In Block 650, a security level requirement is determined based on the connectivity level requirement. At this stage, the connectivity state 452 is used along with the air-gap device information 460 to further determine the security state 454.

In Block 660, an air gap instruction is generated indicating whether to enable the air gap or to disable the air gap based on the security level requirement. As noted above, the air gap is structurally embedded in the air-gap device 110. At this stage, various protocols are established by the security gateway certification 470 and the instruction determination information 480. Once the protocols are met, the method moves to perform enable/disable instruction 490.

Embodiments of the invention may be implemented using virtually any type of computing system, regardless of the platform being used. In some embodiments, the mobility ECUs 180 may be computer systems located in the mobility domain 185 or the convenience domain 175. In some embodiments, the computing system may be a type of computing device or devices that includes at least the minimum processing power, memory, and input and output device(s) to perform one or more embodiments of the invention.

Figure 7:
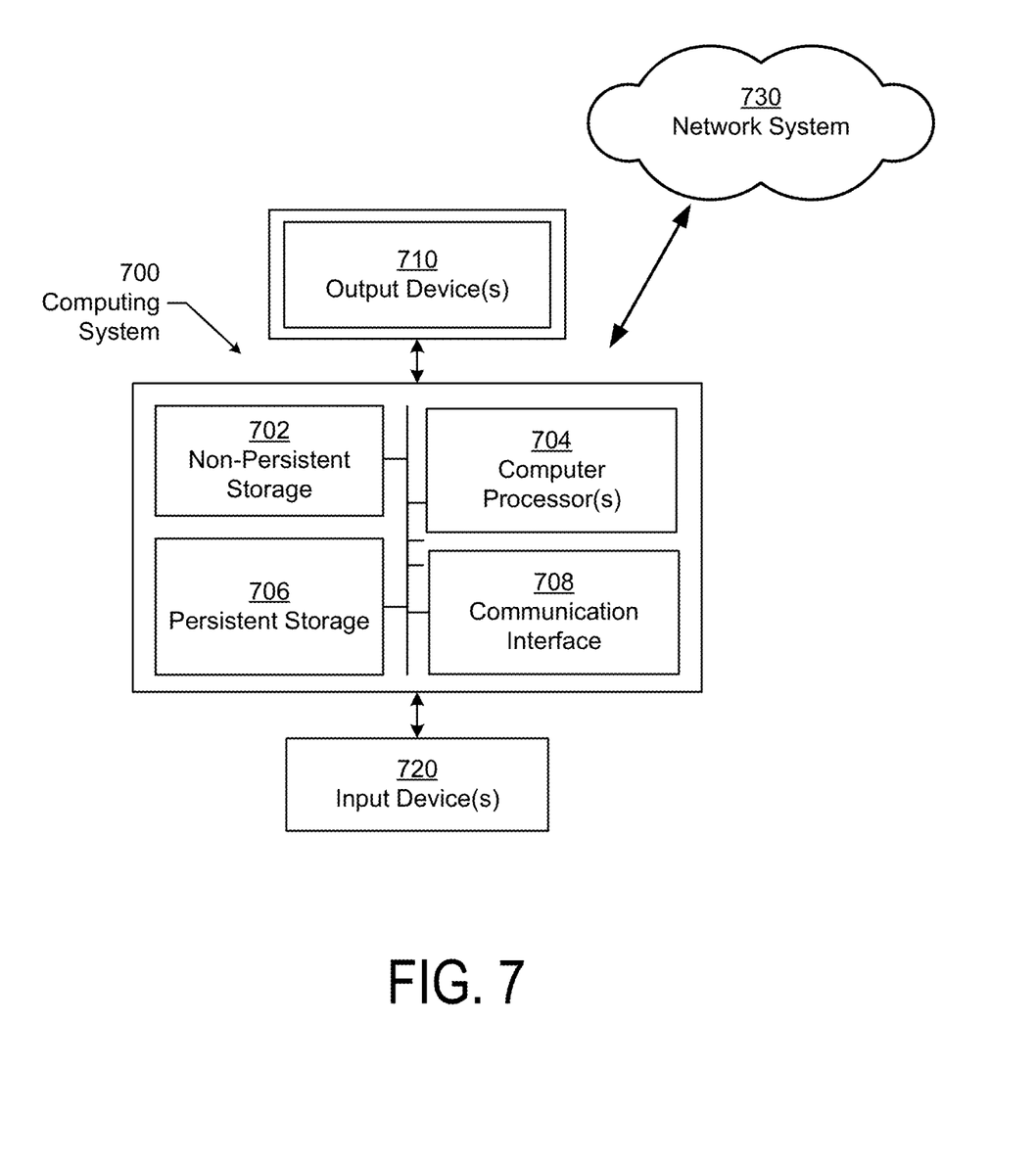
FIG. 7 shows a computer system in accordance with one or more embodiments.

As shown in FIG. 7, a computing system 700 may include one or more computer processor(s) 704, non-persistent storage 702 (e.g., random access memory (RAM), cache memory, or flash memory), one or more persistent storage 706 (e.g., a hard disk), and numerous other elements and functionalities. The computer processor(s) 704 may be an integrated circuit for processing instructions. The computing system 700 may also include one or more input device(s) 720, such as a touchscreen, keyboard, mouse, microphone, touchpad, electronic pen, or any other type of input device. Further, the computing system 700 may include one or more output device(s) 710, such as a screen (e.g., a liquid crystal display (LCD), a plasma display, or touchscreen), external storage, or any other output device. One or more of the output device(s) may be the same or different from the input device(s). In one or more embodiments, for example, the input device 720 may be coupled to a receiver and a transmitter used for exchanging communication with one or more peripherals connected to a network system 730. The receiver may receive information relating to one or more ECUs. The transmitter may relay information received by the receiver to other elements in the computing system 700. Further, the computer processor(s) 704 may be configured for performing or aiding in implementing the processes described in reference to FIGS. 1-5.

The computing system 700 may be an ECU in the convenience domain 175 and connected to the network system 730 (e.g., a Controller Area Network (CAN), a local area network (LAN), a wide area network (WAN) such as the Internet, mobile network, or any other type of network) via a network interface connection (not shown). The network system 730 may be a cloud-based interface performing processing at a remote location from the motor vehicle and connected to the other elements over a network. For example, the computing system 700 may be the infotainment ECUs 250, the body ECUs, 260, or the telematics ECUs 270 in the convenience domain 175 and connected to the network system 730 through a remote connection established using a 5G connection, using protocols established in Release 15 and subsequent releases of the 3GPP/New Radio (NR) standards.

While FIGS. 1-7 show various configurations of components, other configurations may be used without departing from the scope of the disclosure. For example, various components in FIG. 1-3 may be combined to create a single component. As another example, the functionality performed by a single component may be performed by two or more components.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. An air-gap device for cyber isolating mobility systems when a vehicle is in motion, the air-gap device comprising:
   a housing comprising a plurality of input ports and a plurality of output ports,
      wherein the plurality of input ports comprise connections to a secure gateway, and
      wherein the plurality of output ports comprise connections to one or more mobility Electronic Control Units (ECUs);
   at least one pair of terminal contacts,
      wherein the at least one pair of terminal contacts comprise a first terminal contact and a second terminal contact; and
   an air gap embedded in the housing,
      wherein the air gap is closed when the first terminal contact is in contact with the second terminal contact, and
      wherein the air gap is open when the first terminal is not in contact with the second terminal contact,
   wherein the air-gap device is instructed to open the air gap when the vehicle is determined to be in motion or about to be in motion,
   wherein the one or more mobility ECUs indicate to enable the air gap when the vehicle is in motion, and wherein the one or more mobility ECUs indicate to disable the air gap when the vehicle is stopped.

2. The air-gap device of claim 1,
wherein the air-gap device is located between the secure gateway and the one or more mobility ECUs,
wherein the gateway device is connected to one or more infotainment ECUs, one or more Body ECUs, one or more Telematics ECUs, or on-board diagnostics of the vehicle, and
wherein the one or more mobility ECUs comprises one or more powertrain ECUs, one or more chassis ECUs, and one or more advance driver-assistance systems (ADAS) ECUs.

3. The air-gap device of claim 2,
wherein the gateway device obtains a vehicle status of the vehicle, the vehicle status indicating whether the vehicle is in motion.

4. The air-gap device of claim 3,
wherein the one or more mobility ECUs are a plurality of mobility ECUs, and
wherein the plurality of mobility ECUs:
  determine a status of the air-gap device, the status indicating whether the air-gap device is in a secured state,
  identify a plurality of mobility parameters corresponding to the plurality of mobility ECUs, and
  determine a mobility state from the plurality of mobility parameters.

5. The air-gap device of claim 4,
wherein the plurality of mobility ECUs:
  confirm whether the vehicle is in motion,
  confirm a connectivity level requirement based on the comparison of the mobility state and the status of the air-gap device,
  determine a security level requirement based on the connectivity level requirement, and
  generate an air-gap instruction indicating whether to enable the air gap or to disable the air gap based on the security level requirement determined.

6. The air-gap device of claim 5,
wherein the plurality of mobility ECUs coordinate generating the air-gap instruction with one or more additional authentication systems.

7. A system for cyber isolating mobility systems when a vehicle is in motion, the system comprising:
  a gateway device connected to one or more infotainment Electronic Control Units (ECUs), one or more Body ECUs, one or more Telematics ECUs, or on-board diagnostics of the vehicle;
  one or more mobility ECUs, the one or more mobility ECUs comprising one or more powertrain ECUs, one or more chassis ECUs, and one or more advance driver-assistance systems (ADAS) ECUs; and
  an air-gap device, the air-gap device comprising:
    a housing comprising a plurality of input ports and a plurality of output ports,
      wherein the plurality of input ports comprise connections to a secure gateway, and
      wherein the plurality of output ports comprise connections to the one or more mobility ECUs,
    at least one pair of terminal contacts,
      wherein the at least one pair of terminal contacts comprise a first terminal contact and a second terminal contact, and
    an air gap embedded in the housing,
      wherein the air gap is closed when the first terminal contact is in contact with the second terminal contact, and
      wherein the air gap is open when the first terminal is not in contact with the second terminal contact,
    wherein the air-gap device is instructed to open the air gap when the vehicle is determined to be in motion or about to be in motion,
    wherein the one or more mobility ECUs indicate to enable the air gap when the vehicle is in motion, and
    wherein the one or more mobility ECUs indicate to disable the air gap when the vehicle is stopped.

8. The system of claim 7,
wherein the air gap device is located between the secure gateway and the one or more mobility ECUs.

9. The system of claim 8,
wherein the gateway device obtains a vehicle status of the vehicle, the vehicle status indicating whether the vehicle is in motion.

10. The system of claim 9,
wherein the one or more mobility ECUs are a plurality of mobility ECUs, and
wherein the plurality of mobility ECUs:
  determine a status of the air-gap device, the status indicating whether the air-gap device is in a secured state,
  identify a plurality of mobility parameters corresponding to the plurality of mobility ECUs, and
  determine a mobility state from the plurality of mobility parameters.

11. The system of claim 10,
wherein the plurality of mobility ECUs:
  confirm whether the vehicle is in motion,
  confirm a connectivity level requirement based on the comparison of the mobility state and the vehicle status,
  determine a security level requirement based on the connectivity level requirement, and
  generate an air gap instruction indicating whether to enable the air gap or to disable the air gap based on the security level requirement determined.

12. The system of claim 11,
wherein the plurality of mobility ECUs coordinate generating the air-gap instruction with one or more additional authentication systems.

13. A method for isolating mobility systems when a vehicle is in motion, the method comprising:
  obtaining, by a gateway device, a vehicle status of the vehicle, the vehicle status indicating whether the vehicle is in motion or about to be in motion;
  determining, by a plurality of mobility Electronic Control Units (ECUs), a status of an air-gap device, the status indicating whether the air-gap device is in a secured state;
  confirming, by the plurality of mobility ECUs, whether the vehicle is in motion;
  confirming, by the plurality of mobility ECUs, a connectivity level requirement based on the vehicle status;
  determining a security level requirement based on the connectivity level requirement; and
  generating an air gap instruction indicating whether to enable the air gap or to disable the air gap based on the security level requirement determined,
  wherein the plurality of mobility ECUs indicate to enable the air gap when the vehicle is in motion,
  wherein the plurality of mobility ECUs indicate to disable the air gap when the vehicle is stopped, and wherein the air-gap device is incorporated in the securing gateway and one or more ECUs installed in the vehicle.

14. The method of claim 13, the method further comprising:
   identifying, by the plurality of mobility ECUs, a plurality of mobility parameters corresponding to the plurality of mobility ECUs;
   determining, by the plurality of mobility ECUs, a mobility state from the plurality of mobility parameters; and
   confirming, by the plurality of mobility ECUs, the connectivity level requirement based on comparing the mobility state and the vehicle status.

15. The method of claim 13, wherein the air-gap device comprising:
   a housing comprising a plurality of input ports and a plurality of output ports,
      wherein the plurality of input ports comprise connections to the secure gateway, and
      wherein the plurality of output ports comprise connections to the plurality of mobility ECUs;
   at least one pair of terminal contacts,
      wherein the at least one pair of terminal contacts comprise a first terminal contact and a second terminal contact; and
   an air gap embedded in the housing,
      wherein the air gap is closed when the first terminal contact is in contact with the second terminal contact, and
      wherein the air gap is open when the first terminal is not in contact with the second terminal contact,
   wherein the air-gap device is instructed to open the air gap when the vehicle is determined to be in motion.

16. The method of claim 15,
   wherein the air gap device is located between the secure gateway and the plurality of mobility ECUs,
   wherein the gateway device is connected to one or more infotainment ECUs, one or more Body ECUs, one or more Telematics ECUs, or on-board diagnostics of the vehicle, and
   wherein the plurality of mobility ECUs comprises one or more powertrain ECUs, one or more chassis ECUs, and one or more advance driver-assistance systems (ADAS) ECUs.

17. The method of claim 16,
   coordinating, by the plurality of mobility ECUs, generation of the air-gap instruction with one or more additional authentication systems.

* * * * *